(12) United States Patent
Litovtchenko (10) Patent No.: US 9,891,934 B2
(45) Date of Patent: Feb. 13, 2018

(54) CONFIGURATION CONTROLLER FOR AND A METHOD OF CONTROLLING A CONFIGURATION OF A CIRCUITRY

(71) Applicant: Vladimir Litovtchenko, Ebersberg (DE)

(72) Inventor: Vladimir Litovtchenko, Ebersberg (DE)

(73) Assignee: NXP USA, Inc., Austin, TX (US)

( * ) Notice: Subject to any disclaimer, the term of this patent is extended or adjusted under 35 U.S.C. 154(b) by 300 days.

(21) Appl. No.: 14/762,814

(22) PCT Filed: Feb. 12, 2013

(86) PCT No.: PCT/IB2013/051140
§ 371 (c)(1),
(2) Date: Jul. 23, 2015

(87) PCT Pub. No.: WO2014/125326
PCT Pub. Date: Aug. 21, 2014

(65) Prior Publication Data
US 2015/0370580 A1     Dec. 24, 2015

(51) Int. Cl.
*G06F 13/14*     (2006.01)
*G06F 9/445*     (2006.01)
*G06F 13/16*     (2006.01)

(52) U.S. Cl.
CPC .......... *G06F 9/44505* (2013.01); *G06F 13/14* (2013.01); *G06F 13/16* (2013.01); *G06F 13/1694* (2013.01)

(58) Field of Classification Search
CPC ............. G06F 9/44; G06F 13/14; G06F 13/16
See application file for complete search history.

(56) References Cited

U.S. PATENT DOCUMENTS

| 5,537,421 A | 7/1996 | Dujari et al. |
| 5,723,984 A | 3/1998 | Sharpe-Geisler |
| 5,987,487 A | 11/1999 | Welland |

(Continued)

FOREIGN PATENT DOCUMENTS

WO     2011123151     10/2011

OTHER PUBLICATIONS

International Search Report and Written Opinion correlating to PCT/IB2013/051140 dated Nov. 27, 2013.

*Primary Examiner* — Steven Snyder
*Assistant Examiner* — Christopher A Daley (57) ABSTRACT

A configuration controller for and a method of controlling a configuration of a circuitry are provided. The configuration controller comprises an input, a selection checker, a data selector and an output. The input receives an input configuration selection signal which is encoded according to a specific encoding scheme. The selection checker checks a correctness of the received input configuration selection signal and provides to the data selector a selection signal which indicates a specific configuration selection if the input configuration selection data is correct or indicates a default configuration selection if the input configuration selection signal is incorrect according to the specific encoding scheme. The data selector selects configuration data from its internal configuration data storage in accordance with the selection signal and provides the selected configuration data to the output.

20 Claims, 4 Drawing Sheets

(56) References Cited

U.S. PATENT DOCUMENTS

| | | |
|---|---|---|
| 6,351,681 B1 | 2/2002 | Chih et al. |
| 6,452,426 B1 | 9/2002 | Tamarapalli |
| 7,196,562 B1 * | 3/2007 | Luis .................. G06F 1/08 |
| | | 327/147 |
| 7,314,174 B1 | 1/2008 | Vadi et al. |
| 8,996,906 B1 * | 3/2015 | Townley ............. G06F 1/10 |
| | | 326/101 |
| 2003/0212970 A1 | 11/2003 | Stong |
| 2003/0233534 A1 | 12/2003 | Bernhard et al. |
| 2007/0097772 A1 | 5/2007 | Riho et al. |
| 2014/0039649 A1 * | 2/2014 | Wender ............. G05B 19/406 |
| | | 700/81 |

* cited by examiner

CONFIGURATION CONTROLLER FOR AND A METHOD OF CONTROLLING A CONFIGURATION OF A CIRCUITRY

FIELD OF THE INVENTION

This invention relates to a configuration controller for and a method of controlling a configuration of a circuitry. The invention further relates to an integrated circuit comprising the configuration controller and to a computer program product.

BACKGROUND OF THE INVENTION

Often, during power up phase of a device or of an integrated circuit (e.g. with a system on chip, or a memory chip), a start up sequence is executed to initialize the device and its functions. For example, patent application US2003/0233534 discusses the start-up of a computer device. Often this configuration must be accomplished before internal non-volatile memory is powered up and is ready to supply configuration data and/or before a CPU is started. Therefore, the configuration data, which must be provided before the powering up of internal non-volatile memory and/or a CPU, is often provided directly to input pins of the device or of the integrated circuit.

According to road vehicle functional standard safety requirements (like, for example, ISO 26262), automotive safety-oriented devices or systems on chips must be put into a safe state in case of permanent or transient faults. The safe state, is for example, a reset state in which the device or system on chip can be optionally debugged. The devices or systems on chip may have a separate reset controller which may receive, at start up, specific configuration data.

However, when to devices, which have to fulfil the standard safety requirements, configuration data is provided via the input pins of the device of the package of the system on the chip, safety issues may arise when the input pins are, for example, not correctly connected to the printed circuit board or when, in the package of the system on the chip, bonding wires are not well connected. The same safety issues rise when input pins, or wires on the printed circuit board are connected to an incorrect logical value. In such cases incorrect configuration data may be received and the device, the system on the chip, or, for example, the reset controller does not correctly start up and may not end up in the (required) safe state. There is a need to detect whether the received configuration data is correct.

SUMMARY OF THE INVENTION

The present invention provides a configuration controller, an integrated circuit, a method and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1A:
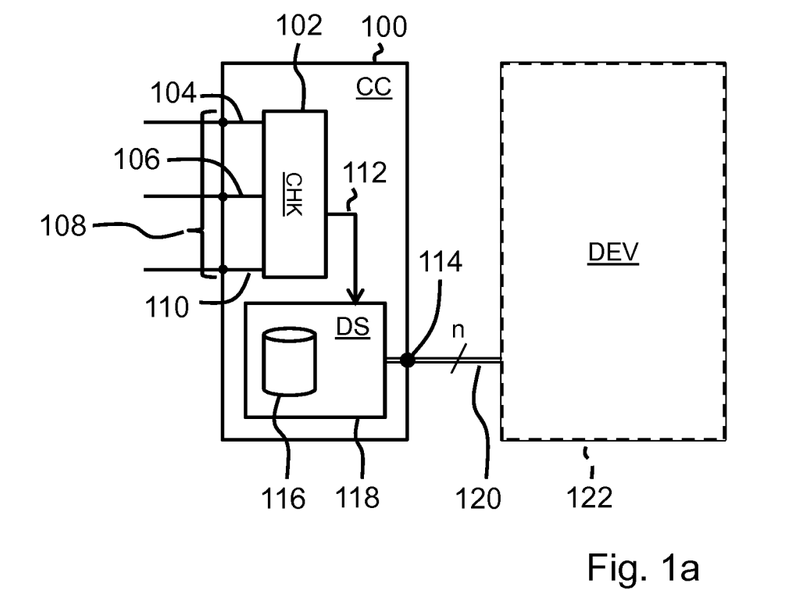
FIG. 1a schematically shows an example of an embodiment of a configuration controller, FIG. 1b schematically shows an example of an embodiment of an integrated circuit, FIG. 2 schematically shows another example of an embodiment of a configuration controller, FIG. 3 schematically shows an example of a circuitry to detect whether a received input signal is correctly encoded according to a one-hot encoding scheme, and FIG. 4 schematically shows an example of a method of controlling a configuration of a circuitry.

FIG. 1a schematically shows an example of an embodiment of a configuration controller 100, CC. The configuration controller 100, CC comprises an input 108, a selection checker 102, CHK, a data selector 118, DS, and an output 114. The configuration controller 100, CC may be used to control the configuration of a device 122, DEV by providing configuration start-up data to the device. The device 122, DEV typically comprises an electronic circuitry (e.g. provided on an integrated circuit), and the configuration controller 100, CC is configured to control the configuration of the electronic circuitry of the device 122, DEV. In another embodiment, the configuration controller 100, CC is integrated in an integrated circuit of the device 122, DEV.

The input 108 comprises a plurality of input lines 104, 106, 110, for receiving an input configuration selection in the form of an input configuration selection signal. An input configuration selection is a number which selects a specific set of configuration data that has to be provided to the device 122, DEV or the electronic circuitry that is coupled to the configuration controller 100, CC. For example, values 0, 1, 2 and 3 may be received to select a specific set of configuration data. The input configuration selection is encoded according to a specific encoding scheme. In an embodiment, the encoding scheme is a one-hot encoding scheme. In a one-hot encoding scheme values are encoded into a plurality of bits wherein all but one bit have the same first value and only one of the bits has a second value. For example, when 1 to 3 must be encoded in the one-hot encoding scheme, in a first embodiment, the possible values are 100, 010, 001, and in a second embodiment, the possible values are 011, 101, 110. Thus, the presented input 108 of FIG. 1a is able to receive three different values when they are encoded according to the one-hot encoding scheme. The value 000 and 111 are strictly speaking an incorrect one-hot encoding. However, in the examples of the current invention the value 000 or 111 may be used for selecting default configuration data. It is to be noted that the input 108 may also comprise another number of input lines 104, 106, 110. The number of input lines 104, 106, 110 depends on the number of selections values that may be provided at the input 108. It is further to be noted that the invention is not limited to one-hot coding. In an embodiment, the encoding scheme provides redundancy which allows checking whether the received input configuration selection signal is correctly encoded according to the encoding scheme. Examples of encoding schemes with additional redundancy are the one-hot encoding scheme, Hamming codes, the use of parity bits in the input configuration selection signal, etc.

In an embodiment, the input 108 comprises 2 input lines. In another embodiment, the input 108 comprises 4 input lines. In a further embodiment, the input 108 comprise 6 input lines or comprises 8 input lines together forming a byte.

The selection checker 102, CHK is coupled to the input 108 and receives the input configuration selection signal. The selection checker 102, CHK is configured to check whether the received input configuration selection signal is correctly encoded according to the encoding scheme. If, in addition to the encoding scheme additional values are also allowed (such as the above discussed 000 or 111 in case of one-hot encoding with three bits), the selection checker 102, CHK is also able to distinguish these values from other incorrect values. In response to this check, the selection checker 102, CHK generates a selection signal 112 which is provided to the data selector 118, DS. If the received input configuration selection signal is not correctly encoded according to the encoding scheme, the selection signal 112 indicates a default configuration selection. If the received input configuration selection signal is correctly encoded according to the encoding scheme, the selection signal 112 indicates a specific configuration selection in accordance with the received input configuration selection signal. The selection signal is, for example, a 8 bit digital signal which may carry values from −127 to 127. For example, a negative value indicates a default configuration selection (which is, for example, a selection of a configuration for a reset state of the device 122, DEV or system on a chip). When the input configuration selection signal is correct according to the encoding scheme, and indicates a specific value, the selection signal may transmit this value to the data selector 118, DS. In another example, the selection signal 112 is a 2 bit digital signal which may communicate the values 0, 1, 2 or 3. If the selection signal 112 is 0, a default configuration selection is indicated and the values 1, 2, 3 indicate a value of the received input configuration selection signal when there are, for example, three input lines 104, 106, 110 which receive the one-hot encoded input configuration selection signal.

The data selector 118, DS receives the selection signal 112. The data selector 118, DS comprises a configuration data storage 116. In the configuration data storage 116 different sets of configuration data are stored. A set may be a plurality of bits, or, in another case, a plurality of bytes. The data selector 118, DS is configured to select configuration data from the configuration data storage 116 in dependence of the received selection signal 112. Thus, the selection signal 112 indicates which data must be provided to the device 122, DEV or system on a chip and the data selector 118, DS selects this data from the configuration data storage 116 and provides this data to the output 114. The configuration data storage 116 may comprise non-volatile memory (or any other type of memory) from which information is selected in dependence of the selection signal 112. Alternatively, the configuration data storage 116 may comprise a plurality of (non-volatile) registers which provide the configuration data. In yet another alternative embodiment, the data selector 118, DS comprises a database which forms the configuration data storage 116 and in dependence of the selection signal 112 specific configuration data is selected.

The output 114 of the configuration controller 100, CC provides the selected configuration data 120. In an embodiment, the output 114 comprises a plurality of output lines, for example, n output lines, which each carry information, for example, a bit (0 or 1)—in this embodiment the configuration data is a set of n bits which are provided to the device 122, DEV or the circuitry of an system on a chip. When the input 108 of the configuration controller 100, CC received a correct input configuration selection signal, the provided selected configuration data 120 is in accordance with the received input configuration selection signal. When the input 108 of the configuration controller 100, CC did not receive a correct input configuration, the selection signal 112 indicates the default configuration selection, and the selected configuration data 120 comprises default configuration data, for example, configuration data which sets the device 122, DEV or the circuitry of the system on the chip in a safe reset or debug mode.

In an embodiment, the configuration data comprises 4 bits and, for example, a selectable default configuration data is 0000, and other selectable configuration data have different values of 4 bits. In another embodiment, the configuration data comprises 8 bit and, for example, a selectable default configuration data is 11111111 and other selectable configuration data have different values of 8 bits. The configuration data is configured such that the circuitry or device 122, DEV, which receives this data at specific inputs, is configured, for example, is configured to operate in a specific mode or is configured by setting specific data field in specific registers.

The configuration controller 100, CC is able to detect when the input lines 104, 106, 110 of the input 108 are not correctly coupled to bonded wires or to a printed circuit board, because it will be detected when the provided input configuration selection signal is not in accordance with the used encoding scheme for encoding the selection values. The configuration controller 100, CC is also able to detect when the wires on the printed circuit board provide incorrect logical values (e.g. because of design or manufacturing errors of the printed circuit board, or, for example, when a user selects incorrect logical values as the result of incorrectly placed jumpers). When the received input configuration selection signal is incorrect, the default configuration data is selected and thereby it is prevented that the device 122, DEV or the circuitry, which receives the selected configuration data 120, receives incorrect configuration data. Thus, the invention of the configuration controller 100, CC provides the possibility to prevent that the incorrect configuration data is provided when contact/input pins/bonded wires/etc. are disconnected and provides the possibility that the device or circuitry which receives the selected configuration data is configured in a safe reset/debug state when errors are detected. A specific choice of an encoding scheme may influence the capability of detecting errors and one-hot encoding of the input configuration selection signal is an advantageous encoding scheme because it comprises a lot of redundancy.

It is to be noted that the input configuration selection signal is encoded according to a specific encoding scheme. Somewhere in the configuration controller 100, CC the signal must be decoded. This function may also be performed by the selection checker 102, CHK when the selection signal 112 is not encoded. This function may also be performed by the data selector 118, DS, when the selection signal 112 is also encoded according to the specific encoding scheme. In this last case it must also be possible to encode the default configuration selection in the selection signal 118 according to the specific encoding scheme. When one-hot encoding is used, the data-bus, which transfers the selection signal 112 to the data selector 118, DS may comprise one line more than the number of input lines 104, 106, 110 for encoding the default configuration selection.

Figure 1B:
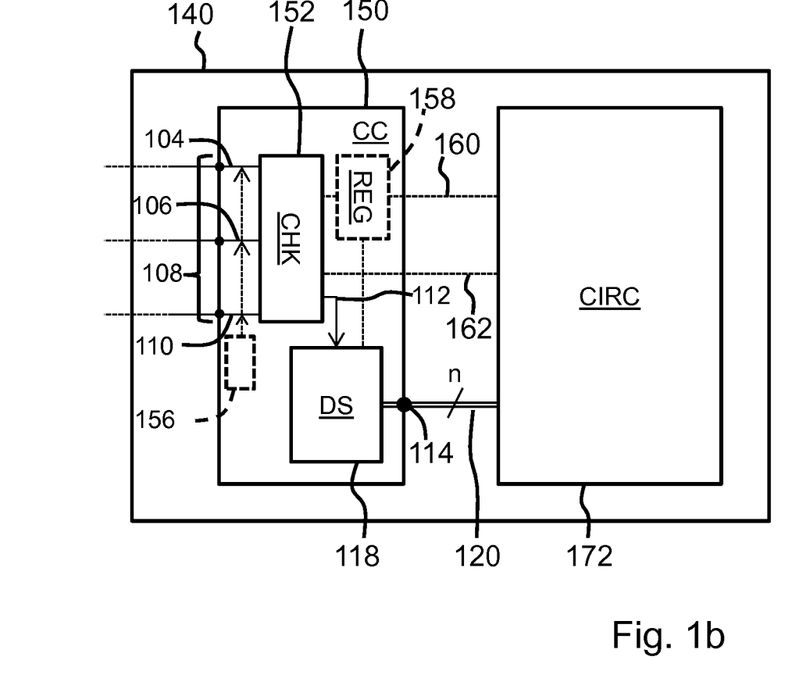

FIG. 1*b* schematically shows an example of an embodiment of an integrated circuit 140 which comprises an embodiment of a configuration controller 150, CC according to the first aspect of the invention and which comprises a circuitry 172, CIRC which has to receive configuration data when the integrated circuit 140 starts up. The embodiment of the configuration controller 150, CC is similar to the configuration controller 100, CC of FIGS. 1a and 1n the following paragraphs optional features of the configuration controller 150, CC are discussed. The integrated circuit 140 may comprise a plurality of sub-systems, such as CPU's, memory units, driving circuits, etc. At least one of the sub-systems has the characteristic that it needs to receive at some of its input lines configuration data before the sub-system has started up completely. The configuration data has the function to configure the sub-system in a certain state which allows a correct start-up and function operation of the sub-system.

The input lines 104, 106, 110 of the input 108 of the configuration controller 150, CC may be connected to an input pin of the integrated circuit 140 to receive from an external system/circuitry or from a printed circuit board an input configuration selection signal. When the system or device in which the integrated circuit 140 is provided starts up, a specific input configuration selection signal is provided to the input pins of the integrated circuit 140 or a sequence of specific input configuration selections signals are provided to the integrated circuit 140. In another embodiment, the input lines are not coupled to an input pin of the integrated circuit 140, but the input lines are directly (hard-coded) wired to specific voltage levels present on the integrated circuit 140 such that a specific input configuration selection signal is provided.

Optionally, the input configuration selection signal is subdivided into input configuration selection sub-signals which are represented by the individual input lines 104, 106, 110. The configuration controller 150, CC may comprise an input default selector 156 which arranges the individual input lines 104, 106, 110 of the input 108 in accordance with a default input configuration selection sub-signal when the respective one or more input lines are not receiving their respective input configuration selection sub-signal. In other words, when a specific input line 104, 106, 110 does not receive a input configuration selection sub-signal, the input default selector 156 arranges the respective input line 104, 106, 110 into a default value. For example, when the specific encoding scheme is one-hot encoding in which only one input line may receive a "1" sub-signal, the input default selector 156 provides to the respective input lines 104, 106, 110 a value "0" sub-signal. Especially, when a received "000" input configuration signal is seen as a selection of a default configuration selection, this provides additional safety: when the respective input lines are not connected to the printed circuit board, or to the input pin of the integrated circuit 140, or if the respective input lines are correctly connected with a bonded wire, the input line is permanently set to the value "0" and no incorrect data is received and the default configuration data is selected. The above also applies, mutatis mutandis, to a one-hot encoding scheme wherein only one input line may receive a "0" sub-signal and the other input lines should receive a logical "1" sub-signal.

Figure 2:
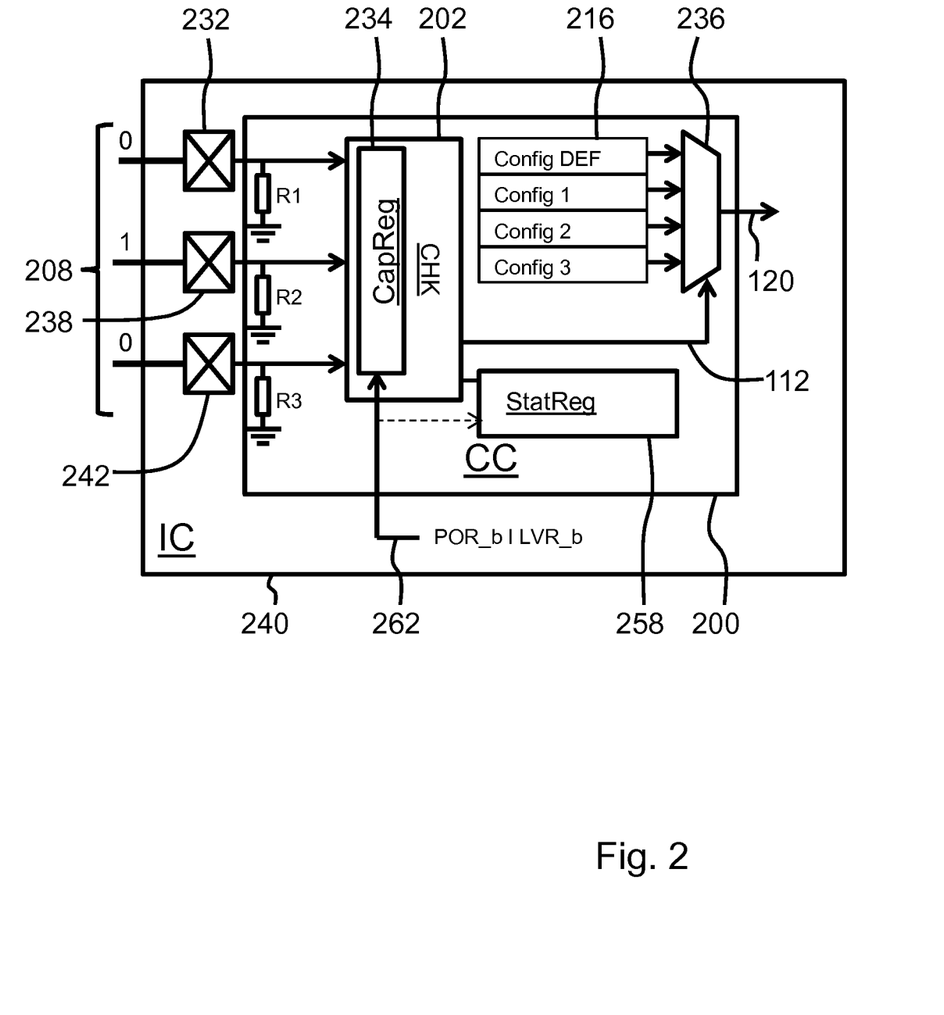

An embodiment of the input default selector 156 is being presented in FIG. 2. If the ground voltage represents the logical value "0", the input lines 104, 106, 110 may be weakly pulled down by resistors R1, R2, R3 which are coupled, respectively, between the input lines and the ground. When an input configuration selection sub-signal is received at the input line, the resistors R1, R2, R3 have only a limit influence on the voltage of the input lines and will not permanently arrange the input lines 104, 106, 110 in the logical "0" state. Embodiments of the input default selector 156 are not limited to the use of resistors R1, R2, R3. In general, the resistors R1, R2, R3 fulfil the role of pull-down elements. In other embodiments, transistors may be combined with resistors. In yet another embodiment wherein the input signals are frequency modulated, the use of capacitors and inductors may be advantageous. In a further embodiment, pull-up elements are used which weakly pull up the voltage level of the input lines to a predefined voltage level, for example, the supply voltage level.

The configuration controller 150, CC may optionally comprise one or more status registers 158, REG for storing status information in relation to the operation of the configuration controller 150, CC. One register of the status registers 158, REG comprises, for example, the result of the last check performed on the input configuration selection signal by the selection checker 152, CHK. Other registers of the status register 158, REG may also comprise the values of the last received input configuration selection signal. The status register 158, REG are coupled to the selection checker 152, CHK (which is similar to the selection checker 102 of FIG. 1a). The circuitry 172, CIRC of the integrated circuit 140 may be connected to the status registers 158, REG by means of a status registers reading connection 160. For example, when the circuitry 172, CIRC of the integrated circuit 140 enters a safe default/debug mode, the circuitry 172, CIRC may read the status data stored in the status registers 158, REG to be able to debug the operation of the configuration controller 150, CC or to log certain events which relate to the operation of the configuration controller 150, CC. In another example, when the circuitry 172, CIRC has been started up an operates in is "normal" functional mode, the circuitry 172, CIRC may also read the values of the status registers 158, REG to perform specific operations which may depend on the start-up or configuration sequence.

The configuration controller 150, CC may comprise an activation input at which it may receive an activation signal 162 which indicates that the configuration controller 150, CC has to provide configuration data 120 at its output 114 which is in accordance with the received input configuration selection signal. The circuitry 172, CIRC may provide the activation signal 162, for example, when the circuitry 172, CIRC is in its start-up sequence. A start-up sequence is a sequence of activities to be performed by the circuitry 172, CIRC, or by the whole system on a chip, when the circuitry 172, CIRC receives power after a period without power. For example, when the circuitry 172, CIRC receives, after a period without power, again power, the circuitry 172, CIRC provides the activation signal 162 such that configuration data 120 is provide by the configuration controller 150, CC. In another embodiment, the circuitry 172, CIRC starts, after receiving power, a start-up sequence and at an specific interval of time of the start-up sequence, the activation signal 162 is provided such that, during this specific interval of time, the selection data 120 in accordance with the input configuration selection signal is provided to the circuitry 172, CIRC. Inside the configuration controller 150, CC, the activation signal 162 is distributed to its different components such that they are activated to perform their tasks. Thus, the selection checker 152, CHK is configured to perform its checking task and to generate the selection signal 112 when it receive the indicating signal 162 which indicates that configuration data 120 must be provided. This applies in a similar way to the status register 158, REG and the data selector 118, DS.

FIG. 2 schematically shows another example of an embodiment of a configuration controller 200, CC. The configuration controller 200, CC is integrated on an integrated circuit 240, IC. The integrated circuit 240, IC comprises input pads 232, 238, 242 to which the input lines of the configuration controller 200, CC are coupled. The pads 232, 238, 242 are coupled, for example, with bonded wires to the input pins of the package of the integrated circuit 240, IC. Thus, the input 208 is formed by input pins of the package of the integrated circuit 240. In the example of FIG. 2 there are three input pins (and, thus, the configuration controller comprises three input lines). The input 208 receives an input configuration selection signal which is encoded according to a one-hot encoding scheme. This means that one of the input lines must be connected to a first voltage which represents the value "1" and the other input lines must be connected to a second voltage which represents the value "0". In the example of FIG. 2, the first voltage is a supply voltage and the second voltage is a ground voltage. The pads 232, 238, 242 are coupled to the input lines of the configuration controller 200, CC and the configuration controller 200, CC comprises an input default selector which weakly connects all input lines to the ground voltage by means of a resistor R1, R2, R3. Thus, when the input lines are not correctly coupled to one of the pad, 232, 238, 242, or when the pads are not correctly coupled with bonded wires to the input pins of the package of the integrated circuit 240, IC, or when the input pins are not correctly coupled to a printed circuit board, or when one of the (relevant) conductors of the printed circuit board is broken, the resistors R1, R2, R3 pull the input lines to the second voltage, and, thus to the logical value "0". It is to be noted that in other encoding schemes it may be useful to connect the resistors R1, R2, R3 in between the input lines and the supply voltage such that the input lines are weakly pulled up to the logical "1" value. As discussed previously, other electronic elements may be used instead of the resistors R1, R2, R3 to obtain the effect of arranging the input lines to a default input configuration selection sub-signal when the respective one or more input lines are not receiving their respective input configuration selection sub-signals.

In FIG. 2, there are three input lines and, thus, three different "normal" configuration selections can be made by providing, for example, the inputs 001, 010, 100 (which may, for example, represent the values 1, 2 and 3). In an optional embodiment, the configuration controller may also receive the value of 000 which corresponds to a default value.

The selection checker 202, CHK comprises in the optional embodiment of FIG. 2 a capture register 234, CapReg. In dependence of a control signal, the capture register 234, CapReg captures the value(s) received at the input lines and stores them in the register for further processing by the selection checker 202, CHK and other elements of the configuration controller 200, CC.

The configuration controller 200, CC receives an activation signal 262 which indicates when the configuration controller has to provide selected configuration data 120. In FIG. 2 the logical expression which is received as the activation signal 262 is POR_b|LVR_b. In specific circuits the meaning of the expression is: the logical or of the POR_b and LVR_b signal, which are, respectively, a power-on reset signal usually provided by a system on chip internal voltage regulator circuitry to reset the system on chip during the power up process, and a low voltage reset signal also provided by the system on chip interval voltage regulator circuitry in cases when specific voltages drop below a certain level. The activation signal 262 is received by the capture register 234, CapReg such that it captures the values of the input lines at the correct moment in time. The activation signal 262 may also be provided to the status registers 258, StatReg such that the status registers 258, StatReg may update the information stored in the register in accordance with the operation of the configuration controller 200, CC that is being activated by the activation signal 262.

Once the capture register 234, CapReg has captured the values of the input lines, the selection checker 202, CHK checks whether the received input configuration selection signal is correctly encoded and subsequently generates the selection signal 112. The selection signal indicates a default configuration selection when the encoding was incorrect (or when at the input lines a signal was received which also indicates the default configuration selection), and indicates another specific configuration selection when the encoding was correct. Such another specific configuration selection is in accordance with the received input configuration selection signal. For example, when the input configuration selection signal was 001, the selection signal indicates "1", when the input configuration selection signal was 010, the selection signal indicates "2", and when the configuration selection signal was 100, the selection signal indicates "3". Thus, the selection checker 202, CHK also comprise means to decode the encoded received input configuration selection signal. Skilled persons in the field of encoding and decoding specific signals know how to decode such a signal when an encoding scheme is selected. Such decoding may be done in special purpose hardware or by a general purpose decoder which is programmed to decode according to the used specific encoding scheme.

The data selector of the configuration controller 200, CC of FIG. 2 comprises four data storage sub-fields Config Def, Config 1 . . . 3 which each comprise a specific set of configuration data. The four data storage sub-fields Config Def, Config 1 . . . 3 may be bytes stored in a non-volatile memory (or any other type of memory), or may be hard-coded bytes or bits. The data selector also comprises a multiplexer 236 which is coupled to the four data storage sub-fields Config Def, Config 1 . . . 3 and in dependence of the selection signal the content of one of the four data storage sub-fields Config Def, Config 1 . . . 3 is provided as the selected (output) configuration data 120. The (output) configuration data comprises for example 8 parallel bit-lines and each one of the four data storage sub-fields Config Def, Config 1 . . . 3 stores 8 configuration bits. When the multiplexer receives a specific selection signal 112, it selects one of the four data storage sub-fields Config Def, Config 1 . . . 3 and provided the bits of the selected data storage sub-field to the corresponding parallel (output) bit-lines. It is to be noted that the embodiments are not limited to parallel (output) bit-lines. The selected configuration data may also be provided via a serial data communication interface (which comprises, for example, only a single (output) line).

Figure 3:
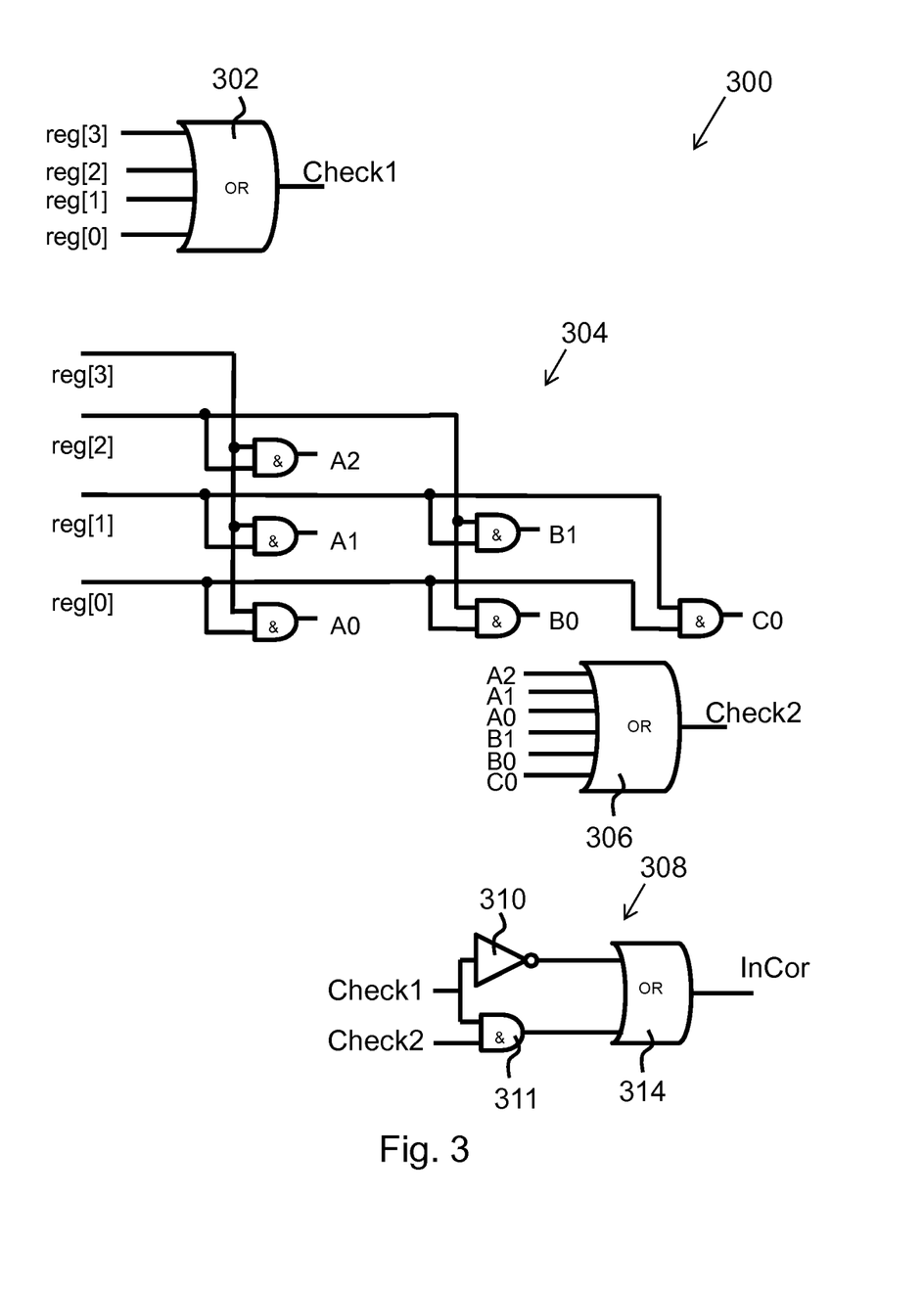

FIG. 3 schematically shows an example of a circuitry 300 to detect whether a received input signal is correctly encoded according to a one-hot encoding scheme. The circuitry 300 comprises different sub-circuitries 302, 304, 308 which are combined according to the indicated signal names to one circuitry 300 which has as an output InCor which logical value is "1" when the received signal is incorrect according to the one-hot encoding scheme and which logical value is "0" when the received signal is correct according to the one-hot encoding scheme. As discussed previously, in the one-hot encoding scheme only one logical value of the different values may be 1 or 0, while all the other logical values are, respectively, 0 or 1. The circuitry 300 is designed to detect whether only one input value has the logical value "1" and all the other input values are "0".

The circuitry 300 is an example of a checking circuitry which is to be implemented in the selection checker of the previous embodiments. More in particular, the circuitry 300 receives the input signals reg[0] . . . reg[3] which are the outputs of capture registers such as capture register 234, CapReg of FIG. 2. In another embodiment the circuitry 300 is directly coupled to the input lines of an input 108, 208 of the embodiments of FIG. 1a, 1b or 2. Additionally, the circuitry 300 is designed to check whether a combination of four input lines, numbered 0 to 3, receive a correctly one-hot encoded signal.

The logical OR circuit 302 receives all four input sub-signals reg[0] . . . reg[3] and provides a Check1 output signal which has the value of a logical "1" when at least one of the input sub-signal reg[0] . . . reg[3] equals a logical "1" and otherwise a the output value is a logical "0".

The sub-circuitry 304 forms logical AND combinations of all possible pairs of the four input sub-signals reg[0] . . . reg[3] by means of the presented logical AND circuits. This leads to the logical output signals A0, A1, A2, B0, B1 and C0. These signals A0, A1, A2, B0, B1 and C0 are provided to a logical OR circuit 306 which provides the Check2 signal. The Check2 signal has the logical value "1" when two or more of the four input sub-signals reg[0] . . . reg[3] are a logical "1", and, otherwise, the Check2 signal has the logical value "0".

Subsequently, the output signals Check1 and Check2 are provided to the last sub-circuitry 308 which combines the signal into an InCor output signal. The sub-circuitry 308 comprises an logical inverter circuit 310 which inverts the Check1 signal and provides the inverted signal to a logical OR circuit 314. The sub-circuit 308 also comprises a logical AND circuit 311 which receives the Check1 and Check2 signal and which provides its output also to the logical OR circuit 314. The logical OR circuit 314 provides the output signal InCor. The output signal InCor has the logical value "1" when the received one-hot encoded signal, received as the four input sub-signals reg[0] reg[3], is incorrectly encoded according to the one-hot encoding scheme (wherein only one sub-signal may be equal to "1" and the other sub-signals should be equal to the logical value "0"). When the received one-hot encoded signal is correctly encoded, the output signal InCor has the logical value "0".

It is to be noted that the number of required logical AND circuits is (n−1)!, wherein n is the number of input lines. In the presented embodiment, the number of required logical AND circuits is (4-1)!=6. Thus, the complete checking circuit 300 of FIG. 3 requires a relatively low amount of logical circuits, and, thus, a relatively low amount of die space when being implemented on an integrated circuit. When the number of input lines results in the need for a relatively large number of logical AND circuits, the skilled person may come up with other checking circuits for checking whether only one bit of the input bits has a value which differs from the other values.

Figure 4:
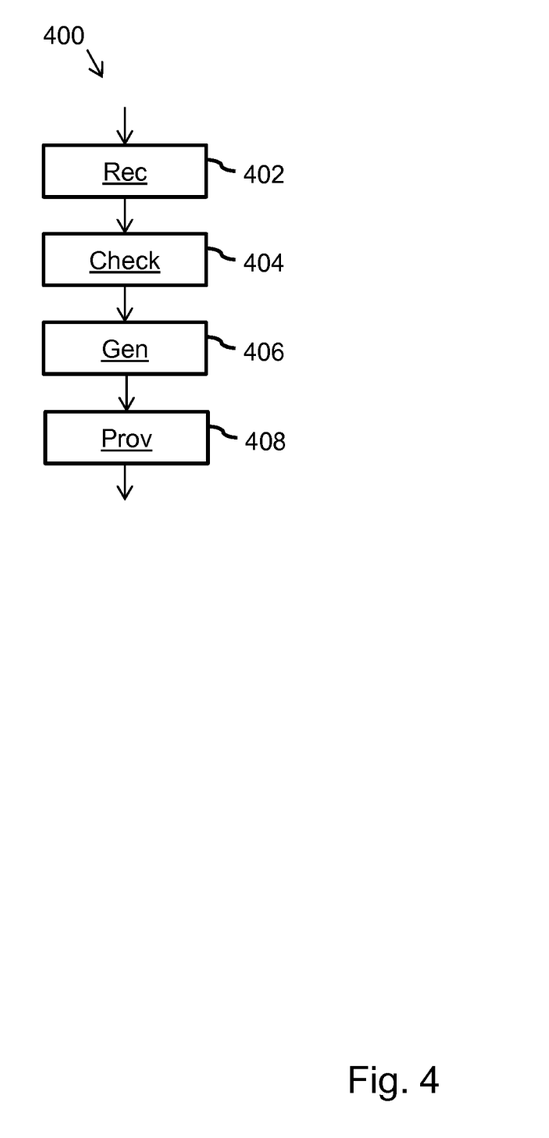

FIG. 4 schematically shows an example of a method 400 of controlling a configuration of a circuitry. The method comprises the stages of: a) receiving 402, Rec an input configuration selection at input lines, the input configuration signal being encoded according to a specific encoding scheme, b) checking 404, Check a correctness of the received input configuration selection signal according to the specific encoding scheme, c) generating 406, Gen a selection signal, the selection signal indicating a default configuration selection when the received configuration selection signal is not correct according to the encoding scheme and, otherwise, the selection signal indicating a specific configuration selection in accordance with the received input configuration selection signal, d) providing 408, Prov configuration data in dependence of the generated selection signal to the circuitry, the provided configuration data being selected from a configuration data storage.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

In summary, a configuration controller for and a method of controlling a configuration of a circuitry are provided. The configuration controller comprises an input, a selection checker, a data selector and an output. The input receives an input configuration selection signal which is encoded according to a specific encoding scheme. The selection checker checks a correctness of the received input configuration selection signal and provides to the data selector a selection signal which indicates a specific configuration selection if the input configuration selection data is correct or indicates a default configuration selection if the input configuration selection signal is incorrect according to the specific encoding scheme. The data selector selects configuration data from its internal configuration data storage in accordance with the selection signal and provides the selected configuration data to the output.

The invention or parts of the invention may also be implemented in a computer program for running on a computer system or processing system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

The semiconductor substrate of the integrated circuit described herein can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors for conducting a signal as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system, for example, from computer readable media such as memory or other media on other computer systems. Such computer readable media may be permanently, removably or remotely coupled to an information processing system such as system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A configuration controller for providing configuration start-up data to a circuitry, the configuration controller comprising
an input comprising input lines for receiving an input configuration selection signal, the input configuration signal being encoded according to a specific encoding scheme,
a selection checker for receiving the input configuration selection signal, for checking a correctness of the received input configuration selection signal according to the specific encoding scheme and for generating a selection signal, wherein the selection checker is configured to generate the selection signal indicating a default configuration selection when the received configuration selection signal is not correct according to the specific encoding scheme and, otherwise, to generate the selection signal indicating a specific configuration selection in accordance with the received input configuration selection signal,
a data selector comprising a configuration data storage, the data selector is configured to receive the selection signal and to select the configuration data from the configuration data storage in dependence of the received selection signal,
an output for providing the selected configuration data to the circuitry.

2. A configuration controller according to claim 1, wherein the specific coding scheme adds redundant information to the encoded signal to allow the checking of the correctness of the received input configuration selection signal according to the specific encoding scheme on basis of the redundant information.

3. A configuration controller according to claim 1, wherein the specific coding scheme is a one-hot encoding scheme, the one-hot encoding scheme defining that only one bit of a series of bit may have a value different from the other bits.

4. A configuration controller according to claim 1, wherein the input configuration selection signal is subdivided into input configuration selection sub-signals being received by individual ones of the input lines, the configuration controller further comprising an input default selector being configured to arrange individual input lines of the input in accordance with a default input configuration selection sub-signal when the respective one or more input lines do not receive their respective input configuration selection sub-signals.

5. A configuration controller according to claim 4, wherein the input default selector comprises for an individual input line a resistor which is coupled between the respective input line and a specific voltage.

6. A configuration controller according to claim 1, wherein
the configuration data storage comprises a plurality of data storage elements for storing in each one of the data storage elements configuration data, one of the data storage elements stores default configuration data and the other data storage elements store other configuration data,
the data selector further comprises a multiplexer which is configured to provide a content of one of the configuration data storage elements to the output in dependence of the received selection signal.

7. A configuration controller according to claim 1, further comprising at least one status register for storing status information in relation to the operation of the configuration controller.

8. A configuration controller according to claim 7, wherein at least one status register stores whether the received input configuration selection signal was correctly encoded according to the specific encoding scheme.

9. A configuration controller according to claim 1, further comprising an activation input for receiving a signal from the circuitry indicating that the configuration controller has to provide configuration data in accordance with the received input configuration selection signal and the configuration controller is configured to operate according to the signal received at the activation input.

10. A configuration controller according to claim 1, wherein the input or the selection checker comprises a capture register for capturing, in response to receiving a capture control signal, the current state of the input lines of the input and for storing the captured states of the input lines.

11. An integrated circuit according to claim 10, the signal received at the activation input is provided as the capture control signal to the capture register.

12. An integrated circuit comprising:
a circuitry which comprises input lines for receiving configuration data,
a configuration controller that provides the configuration data to the input lines of the circuitry;
a selection checker for receiving an input configuration selection signal, for checking a correctness of the received input configuration selection signal according to a specific encoding scheme and for generating a selection signal, wherein the selection checker is configured to generate the selection signal indicating a default configuration selection when the received configuration selection signal is not correct according to the specific encoding scheme and, otherwise, to generate the selection signal indicating a specific configuration selection in accordance with the received input configuration selection signal;
a data selector comprising a configuration data storage, the data selector is configured to receive the selection signal and to select the configuration data from the configuration data storage in dependence of the received selection signal;
an output for providing the selected configuration data to the circuitry.

13. An integrated circuit according to claim 12, the integrated circuit comprising input pads being coupled to the input lines of the input of the configuration controller for receiving the input configuration signal from an external source.

14. An integrated circuit according to claim 12, wherein the integrated circuit provides the input configuration signal to the input of the configuration controller.

15. An integrated circuit according to claim 12, wherein, when an activation input for receiving a signal from the circuitry indicating that the configuration controller has to provide configuration data in accordance with the received input configuration selection signal and the configuration controller is configured to operate according to the signal received at the activation input, the circuitry provides the signal to the activation input of the configuration controller in dependence of a start-up sequence of the integrated circuit.

16. An integrated circuit according to claim 12, wherein, when, at least one status register for storing status information in relation to the operation of the configuration controller, the circuitry is also coupled to at least one the status register and the circuitry is configured to read a content of the at least one status register.

17. The integrated circuit of claim 12, wherein the integrated circuit is implemented in a vehicle.

18. A method of controlling a configuration of a circuitry, the method comprises the stages of:

receiving an input configuration selection at input lines, the input configuration signal being encoded according to a specific encoding scheme, checking a correctness of the received input configuration selection signal according to the specific encoding scheme, generating a selection signal, the selection signal indicating a default configuration selection when the received configuration selection signal is not correct according to the encoding scheme and, otherwise, the selection signal indicating a specific configuration selection in accordance with the received input configuration selection signal, providing configuration data in dependence of the generated selection signal to the circuitry, the provided configuration data being selected from a configuration data storage.

19. The method according to claim 18, wherein the specific coding scheme adds redundant information to the encoded signal to allow the checking of the correctness of the received input configuration selection signal according to the specific encoding scheme on basis of the redundant information.

20. The method according to claim 18, wherein the specific coding scheme is a one-hot encoding scheme, the one-hot encoding scheme defining that only one bit of a series of bit may have a value different from the other bits.

* * * * *